United States Patent [19]
Miller et al.

[11] Patent Number: 5,381,182
[45] Date of Patent: Jan. 10, 1995

[54] FLAT PANEL IMAGE RECONSTRUCTION INTERFACE FOR PRODUCING A NON-INTERLACED VIDEO SIGNAL

[75] Inventors: David W. Miller, Longmont, Colo.; Larry A. Nelson, Bellevue, Wash.; Ronald C. Robinder, Albuquerque, N. Mex.

[73] Assignee: Honeywell Inc., Minneapolis, Minn.

[21] Appl. No.: 127,534

[22] Filed: Sep. 28, 1993

[51] Int. Cl.⁶ .......................... H04N 5/70; H04N 7/01
[52] U.S. Cl. .................................... 348/448; 348/792; 345/138
[58] Field of Search .................. 358/140, 11, 59, 236, 358/240, 241, 138; 345/138, 132, 154, 100, 213, 3; H04N 7/01, 9/30, 5/70; 348/448, 449, 450, 458, 441, 443, 445, 424, 792, 793, 790, 791, 800, 801, 796, 798, 797

[56] References Cited

U.S. PATENT DOCUMENTS

| | | | |
|---|---|---|---|
| 4,633,294 | 12/1986 | Nadan | 358/11 |
| 4,694,348 | 9/1987 | Kamiya et al. | 358/236 |
| 4,694,349 | 9/1987 | Takeda et al. | 358/241 |
| 5,003,388 | 3/1991 | Shirochi et al. | 358/140 |
| 5,032,899 | 7/1991 | Sato | 358/11 |
| 5,113,285 | 5/1992 | Franklin et al. | 359/465 |
| 5,117,159 | 5/1992 | Tomii et al. | 315/366 |
| 5,159,450 | 10/1992 | Senso et al. | 358/140 |

FOREIGN PATENT DOCUMENTS 3-068290  3/1991  Japan ............................. H04N 7/01

Primary Examiner—James J. Groody
Assistant Examiner—Safet Metjahic
Attorney, Agent, or Firm—Craig J. Lervick; Ronald E. Champion

[57] ABSTRACT

An electronic interface for converting an interlaced video signal to a non-interlaced video signal suitable for an LCD flat panel. An analog interpolator scheme is used in which the information available in an incoming video scan line is delayed and sampled, and output signals are created by interpolation between the sampled input and actual and interpolated scan line signals. The output signals are then converted into an integrated, sequential non-interlaced output signal having a frequency corresponding to the horizontal resolution of a scan line of the flat panel.

20 Claims, 6 Drawing Sheets

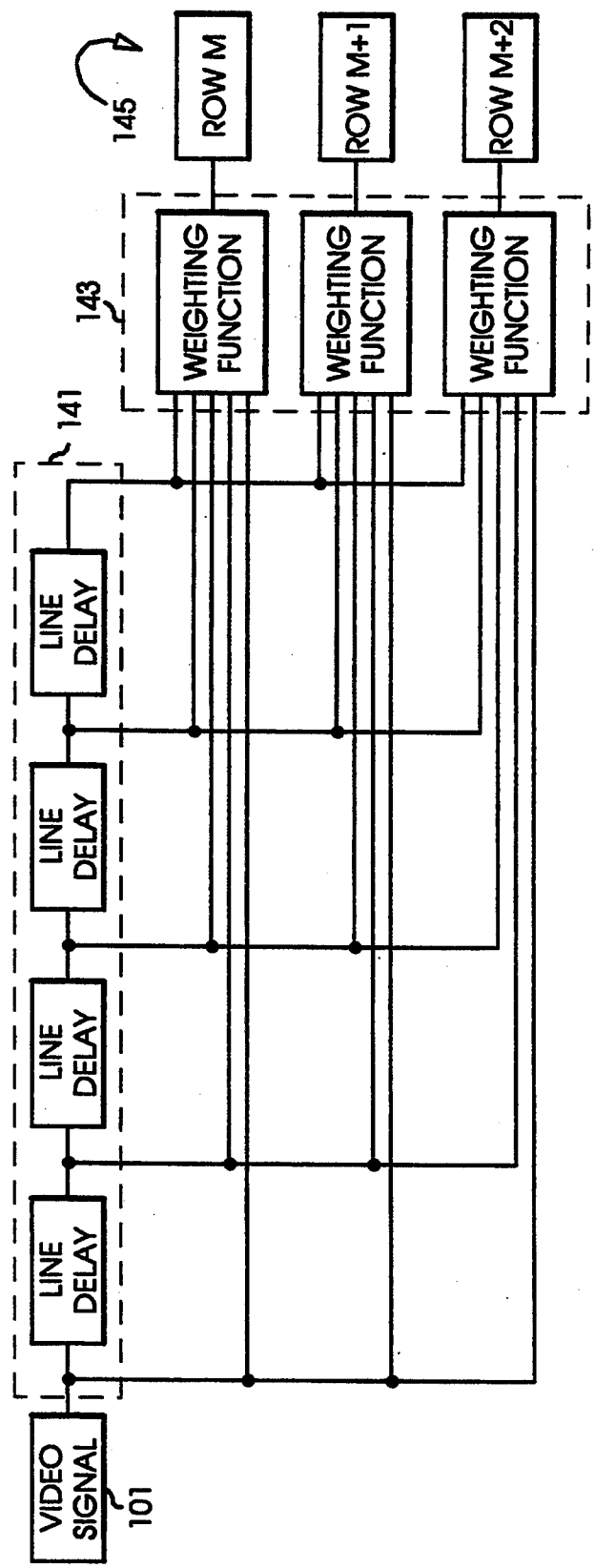

| LINE | INPUT INTENSITY | FLAT PANEL ROWS | | | | | | |
|---|---|---|---|---|---|---|---|---|
| 1 | 5 10 5 5 2 5 | 5 | 10 | 5 | 5 | 2 | 5 | 1 |
|  |  | 2.5 | 5 | 2.5 | 2.5 | 1 | 2.5 | 2 |
|  |  | 0 | 0 | 0 | 0 | 0 | 0 | 3 |
|  |  | 1 | 4 | 1 | 2.5 | 2.5 | 1 | 4 |
| 3 | 2 8 2 5 5 2 | 2 | 8 | 2 | 5 | 5 | 2 | 5 |
|  |  | 1 | 4 | 1 | 2.5 | 2.5 | 1 | 6 |
|  |  | 0 | 0 | 0 | 0 | 0 | 0 | 7 |
|  |  | 0 | 1.5 | 0 | 1 | 3.5 | 3.5 | 8 |
| 5 | 0 3 0 2 7 5 | 0 | 3 | 0 | 2 | 7 | 5 | 9 |
|  |  | 0 | 1.5 | 0 | 1 | 3.5 | 3.5 | 10 |
|  |  | 0 | 0 | 0 | 0 | 0 | 0 | 11 |

ODD FIELD

*Fig. 4a*

| LINE | INPUT INTENSITY | FLAT PANEL ROWS | | | | | | |
|---|---|---|---|---|---|---|---|---|
| 0 |  | 0 | 0 | 0 | 0 | 0 | 0 | 1 |
|  |  | 2 | 4.5 | 1.5 | 2.5 | 2 | 1.5 | 2 |
| 2 | 4 9 3 5 4 3 | 4 | 9 | 3 | 5 | 4 | 3 | 3 |
|  |  | 2 | 4.5 | 1.5 | 2.5 | 2 | 1.5 | 4 |
|  |  | 0 | 0 | 0 | 0 | 0 | 0 | 5 |
|  |  | 0.5 | 3 | 0.5 | 1.5 | 3 | 2 | 6 |
| 4 | 1 6 1 3 6 4 | 1 | 6 | 1 | 3 | 6 | 4 | 7 |
|  |  | 0.5 | 3 | 0.5 | 1.5 | 3 | 2 | 8 |
|  |  | 0 | 0 | 0 | 0 | 0 | 0 | 9 |
|  |  | 1 | 0 | 0 | 2 | 4.5 | 1 | 10 |
| 6 | 2 0 0 4 9 2 | 2 | 0 | 0 | 4 | 9 | 2 | 11 |

EVEN FIELD

*Fig. 4b*

TIME AVERAGED DISPLAY

| LINE | INPUT INTENSITY |
|------|-----------------|
| 1 | 5 10 5 5 2 5 |
| 2 | 4 9 3 5 4 3 |
| 3 | 2 8 2 5 5 2 |
| 4 | 1 6 1 3 6 4 |
| 5 | 0 3 0 2 7 5 |
| 6 | 2 0 0 4 9 2 |
| ⋮ | ⋮ |

FLAT PANEL ROWS

| | | | | | | |
|---|---|---|---|---|---|---|
| 2.5 | 5 | 2.5 | 2.5 | 1 | 2.5 | 1 |
| 2.25 | 4.75 | 2 | 2.5 | 1.5 | 2 | 2 |
| 2 | 4.5 | 1.5 | 2.5 | 2 | 1.5 | 3 |
| 1.5 | 4.25 | 1.25 | 2.5 | 2.25 | 1.25 | 4 |
| 1 | 4 | 1 | 2.5 | 2.5 | 1 | 5 |
| 0.75 | 3.5 | 0.75 | 2 | 2.75 | 1.5 | 6 |
| 0.5 | 3 | 0.5 | 1.5 | 3 | 2 | 7 |
| 0.25 | 2.25 | 0.25 | 1.25 | 3.25 | 2.75 | 8 |
| 0 | 1.5 | 0 | 1 | 3.5 | 3.5 | 9 |
| 0.5 | 0.75 | 0 | 1.5 | 4 | 2.25 | 10 |
| 1 | 0 | 0 | 2 | 4.5 | 1 | 11 |
| | | ⋮ | | | | ⋮ |

*Fig. 4c*

FLAT PANEL IMAGE RECONSTRUCTION INTERFACE FOR PRODUCING A NON-INTERLACED VIDEO SIGNAL

FIELD OF THE INVENTION

The present invention pertains generally to a device for displaying a picture, and more particularly to an electronic interface for converting an interlaced video signal to a non-interlaced video signal suitable for a liquid-crystal display (LCD) flat panel.

BACKGROUND OF THE INVENTION

Standard RS-170 video is normally presented to a display in the form of 525 lines of data, with a 30 Hz frame rate, using a 2:1 interlace system. Of the 525 lines, 484 may be used to carry the image formation, the remainder being used to provide synchronization information and to allow time for the vertical retrace. A cathode ray tube (CRT) typically recreates an image by scanning the display surface (phosphor screen) twice per frame of incoming video. In the first scan (odd fields), the data for one set of lines is presented to the viewer. In the second scan (even fields), data which is offset to lie between the lines of the previous scan is presented. Thus, one set of the total lines is dark for each field where no second field data is presented to the viewer during the first field, and vice versa.

A flat panel display, whether it is an LCD, an EL or a plasma panel display, is typically operated in a non-interlaced mode. Thus, each pixel dot on the display surface is updated each scan. Prior art has used 1) a field store memory to convert the data format, 2) has scanned the data twice onto the same pixels (even and odd fields are superposed onto each other), or 3) has designed the panel to use a number of rows equal to the scanning standard active row count and scan alternate rows of data.

It is desirable to permit a LCD flat panel to be updated in a non-interlaced mode without requiring the use of an expensive field store memory to perform the conversion from interlaced video input to non-interlaced output. It is also desirable to allow the panel to have any number of rows, either greater than or less than the number of scanning lines, and not require the use of superposition to scan the image.

SUMMARY OF THE INVENTION

The present invention provides an electronic interface for converting an interlaced video signal to a non-interlaced video signal suitable for an LCD flat panel. An analog interpolator scheme is used in which the information available in an incoming video scan line is delayed and sampled, and output signals are created by interpolation between the sampled input and actual and interpolated scan line signals. The output signals are then converted into an integrated, sequential non-interlaced output signal having a frequency corresponding to the horizontal resolution of a scan line of the flat panel.

BRIEF DESCRIPTION OF THE DRAWINGS

FIG. 3 is a schematic diagram showing a generalized electronic video interface according to the present invention.

FIGS. 4a, 4b and 4c are tables showing how data is displayed for the flat panel rows according to the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

For the purpose of this description, it is assumed that the LCD flat panel display surface is related to the video signal such that one input line will be displayed over two rows of the LCD flat panel display. However, it will be recognized that the present invention is not limited to the preferred embodiment described below and may be readily adapted to other display resolutions, either greater than or less than the video signal, without loss of generality.

Figure 1:
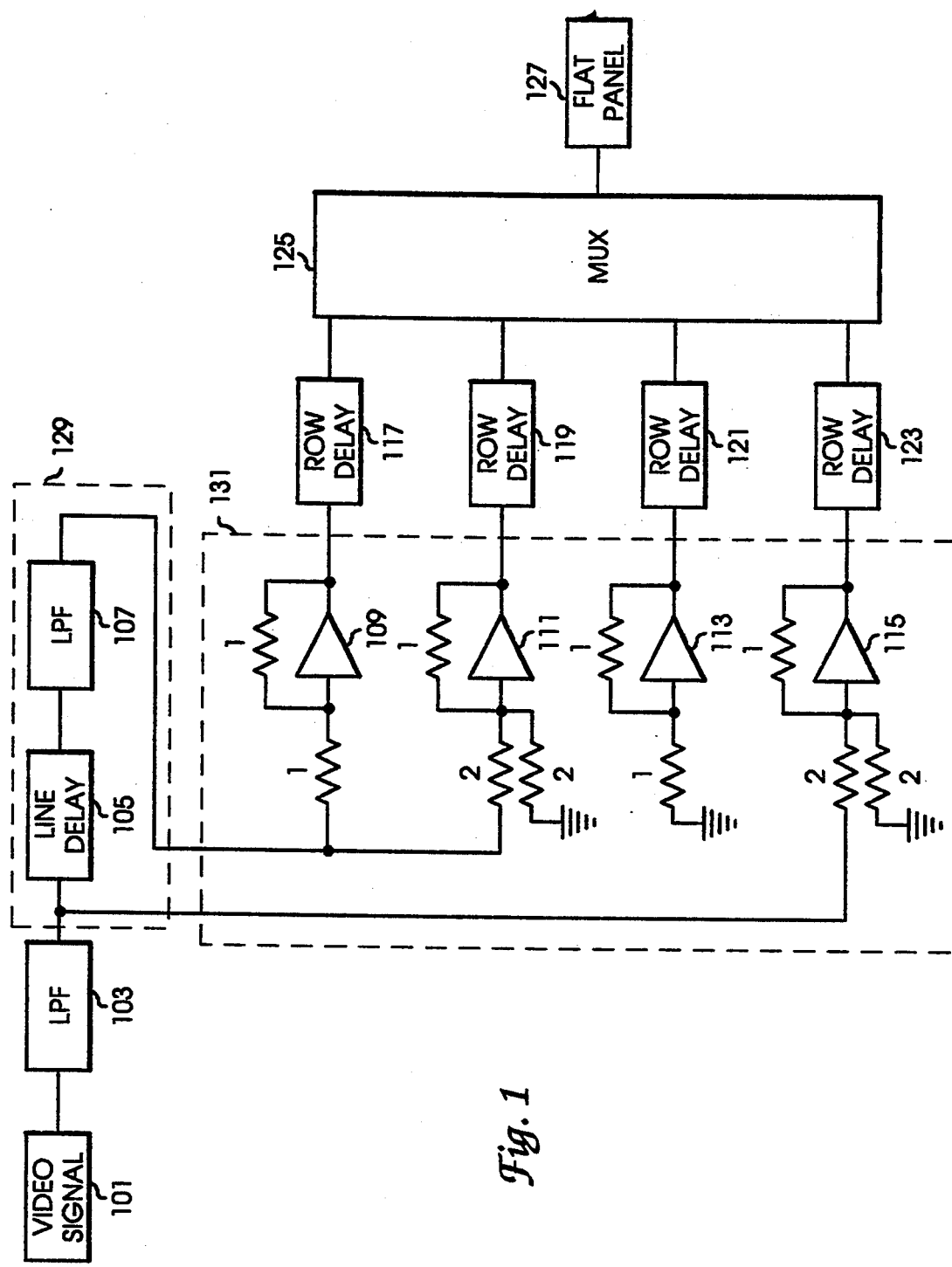
FIG. 1 is a schematic diagram showing a simplified electronic video interface according to the present invention.

FIG. 1 shows a preferred simplified electronic video interface. An incoming video signal 101 typically conforms to a standard RS-170 video signal, having 525 lines, a 60 Hz field rate, a 2:1 interlace, and a bandwidth of 4.5 MHz. The incoming video signal could take-on many forms including an intensity signal or a color video signal having red, green, and blue components. The incoming video signal is preferably bandwidth limited by a low pass filter (LPF) 103 of substantially 4 MHz in order to reduce noise and to assure that known image characteristics are provided. The filtered signal is then typically sent to a line splitter 129 where the signal is sampled by a line delay module, which is preferably of the form of a charge coupled device (CCD) array 105. The CCD array 105 might take and output, for example, 455 samples from an input signal horizontal scan line, corresponding to a horizontal resolution of 455 for the input signal scan line. The sampled output from the CCD array 105 is sent through a second LPF 107 to remove any sampling artifacts and provide a smoothly varying analog signal.

The smoothly varying sampled analog signal is then preferably applied to a weighting module 131, having summing amplifiers 109 through 115. The summing amplifiers are supplied with weighting resistors in order to provide for an interpolation of the inputs provided to each amplifier. The value of the weighting resistors depends on how the incoming video signal must be interpolated for the LCD flat panel display. For example, assuming that one input signal horizontal scan line will be displayed over two rows of the LCD flat panel display, summing amplifier 109 has resistors which provide a weighting factor of 1:1 for the sampled video signal. Therefore, the output of summing amplifier 109 is equal to the input. Summing amplifier 111 has a weighting factor of 1:2 such that the sampled video signal is divided in half, which is equivalent to averaging the field scan line with the zero of the alternate field scan line. Summing amplifier 113 does not use the sampled video signal and instead outputs a zero to the display, representing a missing line of the scan. Summing amplifier 115 provides a signal which is the average of the missing line (zero) and the next input line from the original filtered input video source. It will be recognized that both the number of summing amplifiers and the values for the corresponding weighting resistors may be changed to accommodate alternative scan line conversion ratios without loss of generality.

The output from the summing amplifiers 109 through 115 is typically applied to a series of row delay modules 117 through 123, with each row delay module preferably implemented by a CCD. The delay modules 117 through 123 serve to provide the necessary conversion of horizontal scanning standards. For example, the CCD row delay modules might take 968 samples per line such that the sampling is done in a 1-to-1 fashion with a LCD flat panel horizontal pixel count of 968. The row delay modules 117 through 123 typically receive the weighted interpolated video signals in parallel from the summing amplifiers 109 through 115, and each subsequently outputs a single horizontal scan line to the LCD flat panel in a sequential manner. The sequential read-out of the row delay modules 117 through 123 is preferably accomplished by a 4:1 multiplexer 125. This corresponds to the present example where the LCD flat panel horizontal scan rate is four times the incoming video horizontal scan rate. The preferable use of a separate line delay module, followed by low pass filtering and row delay modules permits the number of samples per line to be altered between the input and output stages, as in the present example of converting from 455 samples per input line of 968 samples per output row. As a practical matter it may be desirable, in terms of clock generation and parts commonality, to provide the line delay module with the same sampling structure as the row delay modules, although this is not essential to the inventive aspect of the present invention.

One horizontal scan line time later from the first input scan line being used, the display interpolation cycle is repeated with the next scan line of the input video signal. Thus, lines 1 and 3 of the incoming video signal are used to create rows 1 through 4 on the LCD flat panel, as described by FIG. 4a. One horizontal scan line time later, incoming video lines 3 and 5 are used to create rows 5 through 8 on the LCD flat panel, as illustrated by FIG. 4a. The signal from the row delay modules 109 through 115 is delayed two line intervals, and therefore the LCD flat panel display exhibits minimal latency, typically two video lines plus any delays encountered in a LCD flat panel display driver system.

In the alternate field from the first incoming video refresh field, the same sampling and reconstruction technique is applied, but the output from the row delay modules 109 through 115 is shifted down by two rows on the LCD flat panel, as shown by FIG. 4b. The first scan line (line 0) is directed to a "null" state corresponding to non-existent rows above the panel, while row 1 receives a zero and row 2 receives the average of a zero and line 2 data, as illustrated by FIG. 4b. Video lines 2 and 4 are then directed to LCD flat panel rows 3 through 6, and so on.

Figure 2:
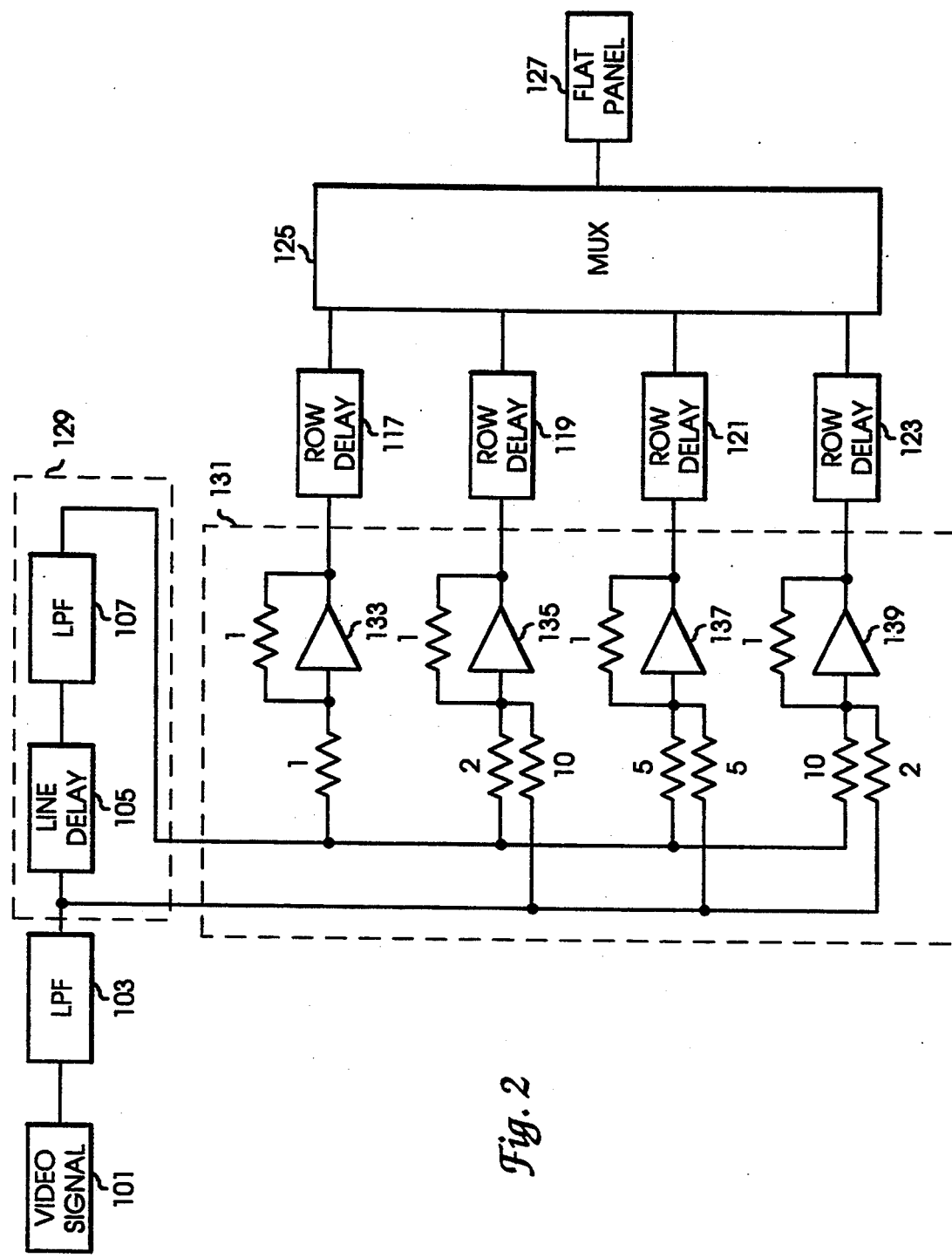
FIG. 2 is a schematic diagram showing an alternative electronic video interface according to the present invention.

FIG. 2 reveals an alternative method of interpolation in which the actual lines of incoming data are summed together, but with some weighting factors which are very small. This simulates the case in which the incoming video display beam width provides some overlap of the information within a single horizontal scan line. There are no artificially introduced zero intensities, but the weighting factor (beam overlap) is set to be quite small for some areas of the LCD flat panel display.

Summing amplifier 133 has resistors which provide a weighting factor of 1:1 for the sampled video signal. Summing amplifier 135 has a weighting factor of 1:2 for the sampled video signal, and 1:10 for the incoming video signal. Summing amplifier 137 weights the sampled video signal by a factor of 1:5, and also the incoming video signal by a factor of 1:5. Summing amplifier 139 provides a signal which weights the sampled video signal by a factor of 1:10, and the incoming video signal by a factor of 1:2. By weighting the incoming video signal instead of using zero intensities, better output resolution is achieved by the device. It will be recognized that number of summing amplifiers and the values for the corresponding weighting resistors may be changed to accommodate alternative scan line conversion ratios without loss of generality. FIG. 3 describes a generalized version of the video interface. A line splitter 141 incorporating one or more delay modules takes the incoming video signal 101 and sends it to one or more weighting functions 143. By selecting the appropriate number of delay modules within the line splitter 141, any number of corresponding desired output scan lines can be generated by the weighting functions 143.

FIGS. 4a through 4c illustrate a typical mapping of input video horizontal scan lines onto the LCD flat panel rows corresponding to the simplified circuit of FIG. 1. In FIGS. 4a through 4c, hypothetical input lines are shown with example values. It will be noticed that row 3 alternates in intensity between a zero (FIG. 4a) and a value equal to the input line 2 intensity (FIG. 4b), while row 2 alternates between one-half of line 1 intensity and one-half of line 2 intensity. The net effect is that the LCD flat panel exhibits a time average intensity which is the same as what would be calculated by averaging all the fields together and with a zero (FIG. 4c). Thus, the LCD flat panel intensity is one-half of what would be obtained with a full-frame memory version of the same LCD flat panel display. While the brightness of the display is reduced, the present invention eliminates the need for a full-frame memory, which, for an RS-170 input of the preferred embodiment described herein, requires 256K words of memory operating at approximately 9 MHz, plus all the associated analog to digital conversion and digital image reconstruction circuitry. The present invention thus provides for a low-cost, minimal parts count design.

In the case of the first embodiment shown by FIG. 1, scan lines 2, 4, etc. are zero during the odd field time, and scan lines 1, 3, etc. are zero during the even field time. This results in a reduction of brightness of 2:1 compared with the case of having all lines present in numerical sequence. That is, in the case of a non-interlaced input there is twice the luminance than is observed with an interlaced input.

Figure 5:
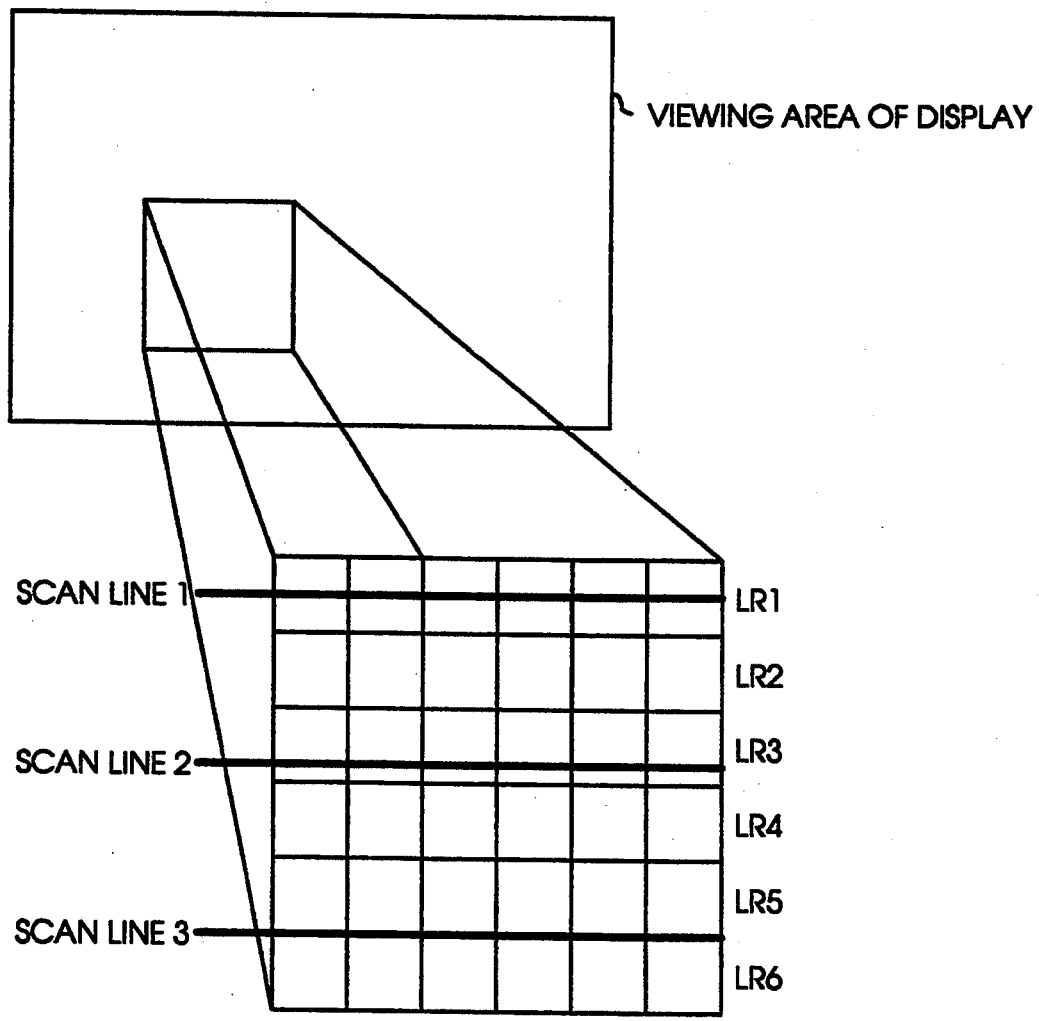
FIG. 5 is a diagram showing how scan lines are mapped onto the flat panel according to the present invention.

FIG. 5 illustrates how scan lines are mapped onto the flat panel (a scan line being a theoretical construct of infinitesimal width). The first scan line shown lies roughly on the center of physical panel row $L_{R1}$. The second scan line lies somewhat below the center of panel row $L_{R5}$. This pattern repeats, with the spacing between panel rows and scan lines dependent on the relative geometries. In a particular instance of interest to the assignee of the present invention, Honeywell, Inc., the LCD flat panel consists of 1024 rows and the scanning standard is 480 lines. This represents a ratio of 32 rows to 15 scan lines, or 2.133:1.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The present invention is to be limited only in accordance with the scope of the appended claims, since others skilled in the art may devise other embodiments still within the limits of the claims.

The embodiments of the invention in which an exclusive property or right is claimed are defined as follows:

1. A video interface apparatus to convert an incoming interlaced video signal to an outgoing non-interlaced video signal suitable for an LCD flat panel, the apparatus comprising:
   (a) line splitter means for splitting the incoming video signal into an original signal and at least one delayed signal for later use in generating the outgoing non-interlaced video signal;
   (b) interpolation means connected to the line splitter means for weighting the delayed signal and for providing an interpolated analog output signal of the delayed signal and the original signal, wherein the interpolated analog output signal comprises a plurality of discrete non-interlaced scan line signals which are both actual and interpolated, and wherein each of the plurality of interpolated scan line signals comprise an average signal between two adjacent scan line signals; and
   (c) output means connected to the interpolation means for converting the plurality of actual and interpolated scan line signals into an integrated, sequential, non-interlaced signal output having a frequency corresponding to the horizontal resolution of a scan line of the flat panel.

2. The video interface apparatus of claim 1, wherein the line splitter means comprises at least one charge coupled device for providing at least one delayed signal.

3. The video interface apparatus of claim 1, wherein the interpolation means further comprises means for averaging the incoming video signal and the weighted conditioned signal to provide the interpolated output of the analog signal.

4. The video interface apparatus of claim 1, wherein the output means comprises a multiplexer.

5. The video interface apparatus of claim 1, wherein:
   (a) the incoming video signal comprises a color video signal having red, green, and blue (RGB) components; and
   (b) the line delay means, interpolation means, and output means are duplicated in triplicate to process the RGB components of the incoming color video signal.

6. The video interface apparatus of claim 1 further comprising line filter means connected to the line delay means for filtering the delayed signal to provide a smoothly varying analog signal.

7. The video interface apparatus of claim 6, wherein the line filter means comprises a low pass filter (LPF).

8. A video interface apparatus to convert an incoming interlaced video signal to an outgoing non-interlaced video signal suitable for an LCD flat panel, the apparatus comprising:
   (a) first filter means for filtering the incoming video signal;
   (b) line splitter means connected to the first filter means for splitting the incoming video signal into an original signal and at least one delayed signal for later use in generating the outgoing non-interlaced video signal;
   (c) second filter means connected to the line splitter means for filtering the delayed signal and providing a smoothly varying analog signal;
   (d) interpolation means connected to the second filter means for weighting the analog signal and for providing an interpolated output of the analog signal, wherein the interpolated analog output signal comprises a plurality of discrete non-interlaced scan line signals which are both actual and interpolated, and wherein each of the plurality of interpolated scan line signals comprise an average signal between two adjacent scan line signals;
   (e) row sampling means connected to the interpolation means for sampling the interpolated output from the interpolation means and for converting the plurality of actual and interpolated scan line signals into an integrated, sequential, non-interlaced signal output having a frequency corresponding to the horizontal resolution of a scan line of the flat panel; and
   (f) output means connected to the row sampling means for sequentially reading the converted signal output from each of the plurality of row sampling means and providing the outgoing non-interlaced video signal.

9. The video interface apparatus of claim 8, wherein the first filter means comprises an LPF.

10. The video interface apparatus of claim 8, wherein the line splitter means comprises at least one charge coupled device for providing at least one delayed signal.

11. The video interface apparatus of claim 8, wherein the second filter means comprises an LPF.

12. The video interface apparatus of claim 8, wherein the interpolation means comprises a plurality of summing amplifiers connected to the incoming video signal and the smoothly varying analog signal.

13. The video interface apparatus of claim 8, wherein the interpolation means further comprises means for averaging the incoming video signal and the weighted analog signal to provide the interpolated output of the analog signal.

14. The video interface apparatus of claim 8, wherein the row sampling means comprises a plurality of charge coupled devices.

15. The video interface apparatus of claim 8, wherein the output means comprises a multiplexer.

16. The video interface apparatus of claim 8, wherein:
   (a) the incoming video signal comprises a color video signal having RGB components; and
   (b) the first filter means, line delay means, second filter means, plurality of interpolation means, plurality of row sampling means and output means are duplicated in triplicate to process the RGB components of the incoming color video signal.

17. A video interface apparatus to convert an incoming interlaced video signal to an outgoing non-interlaced video signal suitable for an LCD flat panel, the apparatus comprising:
  (a) first LPF means for filtering the incoming video signal;
  (b) line splitter means connected to the first LPF means for splitting the incoming video signal into an original signal and at least one delayed signal for later use in generating the outgoing non-interlaced video signal;
  (c) second LPF means connected to the line splitter means for filtering the output signal and providing a smoothly varying analog signal;
  (d) a plurality of summing amplifier means connected to the second LPF means and incoming video signal for weighting the analog signal and averaging the incoming video signal and the weighted analog signal to provide the interpolated output of the analog signal, wherein the interpolated analog output signal comprises a plurality of discrete non-interlaced scan line signals which are both actual and interpolated, and wherein each of the plurality of interpolated scan line signals comprise an average signal between two adjacent scan line signals;
  (e) a plurality of row sampling means connected to the plurality of summing amplifier means for sampling the interpolated output from each of the plurality of summing amplifier means and for converting the plurality of actual and interpolated scan line signals into an integrated signal output having a frequency corresponding to the horizontal resolution of a scan line of the flat panel; and
  (f) multiplexer means connected to the plurality of row sampling means for sequentially reading the converted output from each of the plurality of row sampling means and providing the outgoing non-interlaced video signal.

18. The video interface apparatus of claim 17, wherein the line splitter means comprises at least one charge coupled device for providing at least one delayed signal.

19. The video interface apparatus of claim 17, wherein the plurality of row sampling means comprises a plurality of charge coupled devices.

20. The video interface apparatus of claim 17, wherein:
  (a) the incoming video signal comprises a color video signal having RGB components; and
  (b) the first LPF means, line delay means, second LPF means, plurality of summing amplifier means, plurality of row sampling means and multiplexer means are duplicated in triplicate to process the RGB components of the incoming color video signal.

* * * * *